United States Patent [19]

Dobler et al.

[11] Patent Number: 5,390,549
[45] Date of Patent: Feb. 21, 1995

[54] MEASURING DEVICE FOR DETERMINATION OF ROTATION ANGLE OR TORQUE OF A STATIONARY OR ROTATING SHAFT

[75] Inventors: Klaus Dobler, Gerlingen; Hansjörg Hachtel, Weissach, both of Germany

[73] Assignee: Robert Bosch GmbH, Stuttgart, Germany

[21] Appl. No.: 752,492

[22] PCT Filed: Jan. 24, 1991

[86] PCT No.: PCT/DE91/00072
§ 371 Date: Aug. 26, 1991
§ 102(e) Date: Aug. 26, 1991

[87] PCT Pub. No.: WO91/12504
PCT Pub. Date: Aug. 22, 1991

[30] Foreign Application Priority Data

Feb. 15, 1990 [DE] Germany .................. 4004589

[51] Int. Cl.$^6$ ............................................ G01L 3/02
[52] U.S. Cl. .................... 73/862.331; 73/862.326; 73/862.334
[58] Field of Search ............ 73/862.324, 862.325, 73/862.326, 862.328, 862.331, 862.334, 862.335; 324/209

[56] References Cited

U.S. PATENT DOCUMENTS

| | | | |
|---|---|---|---|
| 4,356,732 | 11/1982 | Hachtel et al. | 73/862.325 X |
| 4,448,084 | 5/1984 | Dobler et al. | 73/862.331 |
| 4,712,432 | 12/1987 | Hochstein et al. | 73/862.334 |
| 4,785,675 | 11/1988 | Takasu et al. | 73/862.324 X |
| 4,876,899 | 10/1989 | Strott et al. | 73/862.332 X |
| 4,907,460 | 3/1990 | Taniguchi et al. | 73/862.331 |
| 5,083,468 | 1/1992 | Dobler et al. | 73/862.331 |
| 5,115,685 | 5/1992 | Jorgensen et al. | 73/862.331 |

FOREIGN PATENT DOCUMENTS

| | | | |
|---|---|---|---|
| 0144803 | 9/1988 | European Pat. Off. | |
| 2232490 | 12/1990 | United Kingdom | 73/862.333 |
| 0673871 | 7/1979 | U.S.S.R. | 73/862.333 |

Primary Examiner—Richard E. Chilcot, Jr.
Assistant Examiner—Elizabeth L. Dougherty
Attorney, Agent, or Firm—Michael J. Striker

[57] ABSTRACT

A measuring device for determining torque includes a measuring system, e.g. measuring coils, and a twistable torsion pipe (10) having throughgoing openings (12) extending in the axial direction. Crosspieces (13, 14) of different widths are located between the throughgoing openings (12). Slots (15) are formed across the broader crosspieces (13). Accordingly, at lower torques, the torque is transmitted only by the narrow crosspieces (14). If the torque exceeds the rigidity of the narrow crosspieces (14), the slot (15) is closed, i.e. the two parts (13a, 13b) of the broad crosspiece (13) contact one another. Accordingly, a higher torque can be transmitted by the crosspieces (13) in a second measurement area or, if the rigidity of the crosspieces (13) is great enough, the latter can be used as protection against overloading. Further, it is also possible to provide additional overload protection by providing a recess (35) and a protuberance (36) in the torsion pipe (10). The torque sensor is constructed in a particularly simple manner and can determine the torque in a plurality of measurement ranges and with the aid of overload protection.

9 Claims, 4 Drawing Sheets

MEASURING DEVICE FOR DETERMINATION OF ROTATION ANGLE OR TORQUE OF A STATIONARY OR ROTATING SHAFT

BACKGROUND OF THE INVENTION

The present invention relates to a measuring device for determining rotation angle or torque of a stationary or rotating shaft.

A measuring device of this type is known including a torsion pipe connected to the shaft, which is twistable when a torque is applied to one end and measuring means, for example including measuring coils in which an eddy current is generated, associated with the torsion pipe to determine angular position or torque from the response of the torsion pipe.

In such a measuring device, which is known from EP-PS 0 144 803, the torsion shaft is constructed as a pipe which is non-rigid with respect to torsion. This pipe comprises two parts which are connected with one another via a rotatable snug fit. However, the adjustment of the contactless measuring system is only possible when mounting on the torsion shaft. Accordingly, when installing or exchanging the torsion shaft, the angular position of the measuring system must be adjusted in an extremely precise manner. There is no protection against overloading. Further, a torsion pipe with slots is mentioned in EP-PS 144 803. However, this can be used for measurement only in a single measurement area.

SUMMARY OF THE INVENTION

It is an object of the present invention to provide a measuring device for determining rotational angle or torque of a stationary or rotating shaft having none of the above mentioned disadvantages.

This object and others which will become more apparent hereinafter is attained in a measuring device comprising a torsion pipe twistable under an applied torque and connectable to the shaft whose rotational position or torque is being measured and measuring means associated with the torsion pipe to determine angular position or torque from the response to the torsion pipe. The torsion pipe has throughgoing openings extending in an axial direction of the torsion pipe.

According to the invention, the torsion pipe is provided with crosspieces of greater rigidity and crosspieces of lesser rigidity, each of the crosspieces being located between adjacent throughgoing openings. The crosspieces having a greater rigidity are provided with at least one slot extending between the throughgoing openings adjoining the crosspieces of greater rigidity so that the crosspieces of greater rigidity are divided into two crosspiece parts.

In contrast, the measuring device, according to the invention, has the advantage that the torsion pipe can be used for measurement without an additional torsion shaft, especially with smaller torques, and that an adjustment of the measuring system is no longer required when exchanging the torsion shafts when additional torsion shafts are used. As a result of a simple construction, it is possible to provide overload protection for the torsion pipe or torsion shaft by slots or protuberances. Further, measurements can be made over a wider range with a single torsion pipe or an additional torsion shaft. Thus, it is possible e.g. to construct the torsion pipe so as to be particularly non-rigid in the low-torque range and to provide the torsion pipe with a greater rigidity against torsion in a subsequent, higher torque range. An additional overload protection can be provided by suitably forming the torsion pipe so overload protection is effective in both rotating directions. If another torsion shaft constructed as a solid shaft is installed in the hollow shaft in addition, the desired measurement range can be set within broad limits by means of selecting the torsion diameter of the shaft. The comparatively smaller torque can be determined by the hollow shaft in a particularly precise manner, while the comparatively higher torque is determined by the additional torsion shaft. In so doing, the measurement ranges switch automatically in the hollow shaft, so that no additional steps are necessary during measurement. The construction with a plurality of measurement areas and with overload protection can also be provided in a particularly simple manner.

In a preferred embodiment of the invention, the crosspieces of greater rigidity are comparatively broader crosspieces and the crosspieces of lesser rigidity are thinner crosspieces, and each of the two crosspieces parts of the crosspieces of greater rigidity are structured to contact each other when a predetermined rotation angle is exceeded by the thinner crosspieces. This type of structure helps to prevent overload and additional measurement ranges.

Advantageously the slots are oriented at an orientation angle of about 45° relative to the axial direction of the torsion pipe. The slots in successive crosspieces of greater rigidity in the axial direction can be oriented in different directions relative to each other. The torsion pipe can also be provided with a recess and an adjacent protuberance projecting into the recess as an additional protection against overload.

An additional torsion shaft can be located interiorly in the torsion pipe so as to add additional mechanical torsional rigidity to the torsion pipe.

In another embodiment of the invention two bodies can be attached rigidly to the torsion rod at their respective end portions spaced from each other so that both bodies are rotatable relative to each other when the torsion pipe is subjected to a torsion. When the torsion pipe is twisted, an area of overlap of the bodies changes when the angle of rotation changes. The measuring means can be provided with measurement coils producing a measurement signal in at least one of the measurement coils depending on the size of the overlapping area of the two bodies, which can be inner and outer slotted sleeve rotatable relative to each other and supported inside each other in a concentric manner.

BRIEF DESCRIPTION OF THE DRAWINGS

Embodiment examples of the invention are shown in the drawing and explained in more detail in the following description.

DETAILED DESCRIPTION OF THE EMBODIMENT EXAMPLES

Figure 1:
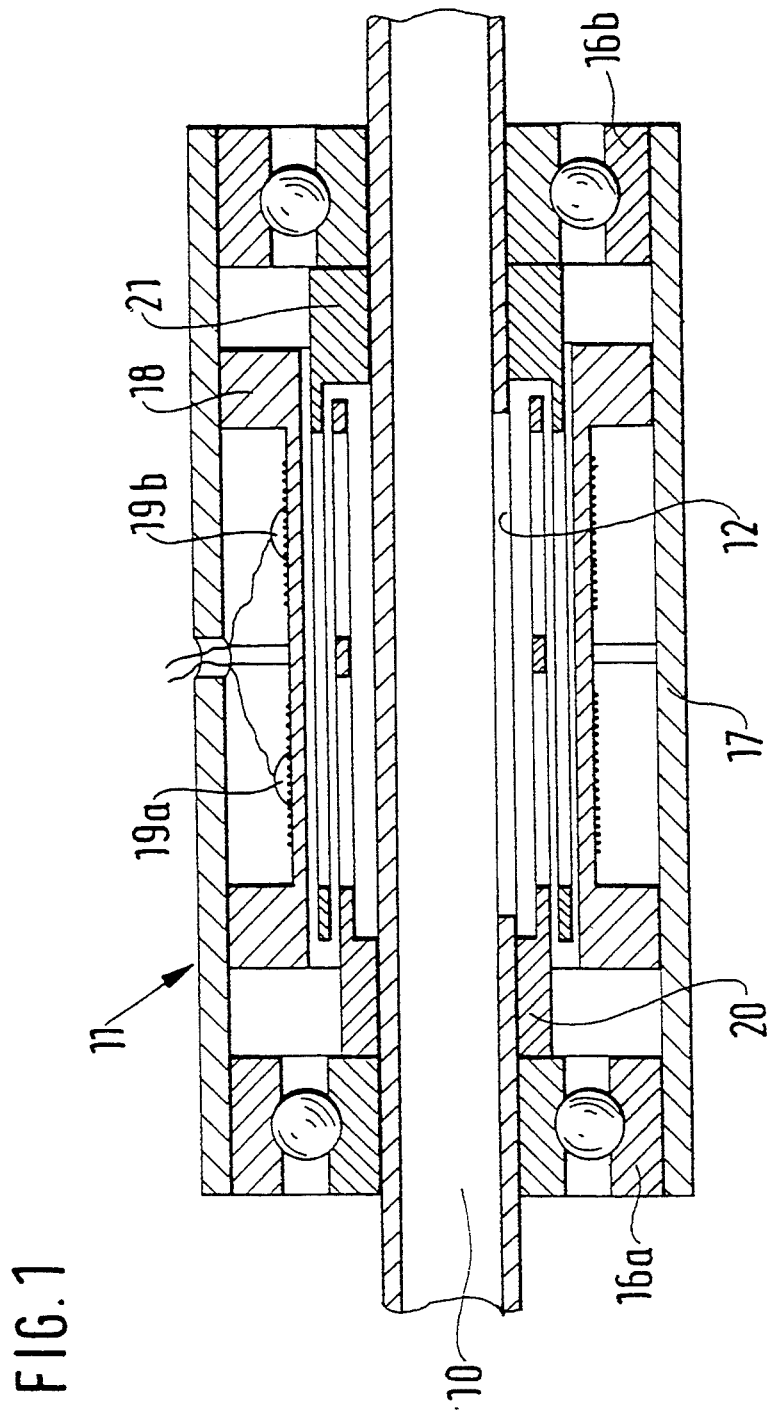
FIG. 1 is a longitudinal cross-sectional view through a measuring device according to the invention for determining torque.

FIG. 1 shows a torsion pipe, designated by 10, which transmits a torque and accordingly also undergoes a certain relative angular rotation within itself with reference to a predetermined unit of length, that is, it is subjected to torsion by a shaft 101 whose rotational position is to be measured. A contactless measuring means 11 which is mounted on the torsion pipe 10 and supported by the latter serves to measure the angle of rotation and, as a result of this, the transmitted torque. As can be seen from FIG. 2, the torsion pipe 10 is provided with a plurality of throughgoing openings 12 in the radial direction. The crosspieces 13, 14 located between the throughgoing openings 12 have different strength and breadth. Thus, a broad crosspieces 13 is arranged following a thin crosspiece 14 as seen in the radial direction in FIG. 2. Slots 15 are formed in the broad crosspiece 13 at an angle of approximately 45° relative to the axial direction of the torsion pipe 10. The slots are located approximately in the longitudinal center of the crosspieces 13.

A stationary housing 17 is supported on the torsion pipe 10 by two bearings 16a, 16b. The housing 17 has the shape of a cylindrical pipe piece and is securely connected with the outer rings of the bearings 16, 16b/ The purpose of the stationary housing 17 is to support a coil body 18 on the inside and approximately in the center. This coil body 18 receives at least one, preferably two or more, measuring coils 19a, 19b of the measuring means 11.

The following constructions refer to a measurement of the torque using the so-called eddy current principle. However, the construction of the torsion pipe 10, according to the invention, can also be used in a number of other measuring systems suitable for carrying out such measurements. For this purpose, it is necessary, e.g. to be able to determine, with the use of a suitable apparatus, the change in path of two bodies which rotate relative to one another. Thus, for example, it is a simple matter to apply the inductive principle, since the change in the overlap ratio of two sleeve bodies can be determined either directly by induction or by coupling fields. Other measuring systems can be used e.g. capacitative, optical, magnetostrictive systems. The relative rotation of the torsion pipe can also be determined by wire strain gauges and the like. In the embodiment example shown in FIG. 1, the eddy current principle is preferably used for measurement. The two bodies, which are rotatable relative to one another, are constructed as an inner slotted sleeve 20 and as an outer slotted sleeve 21. Both slotted sleeves 20, 21 are securely and immovably connected with the torsion pipe 10 by enlarged flanges which are arranged at a distance from one another as close as possible to the bearings 16a, b. Thus, two bodies are formed which engage one inside the another in a concentric manner and comprise slots, windows or recesses which are distributed along their circumference and along their length. The measurement principle is described extensively in U.S. Pat. No. 4,356,732. Depending on the angle of rotation, different eddy current influences result in the two measuring coils 19a, 19b, whose magnitude depends on the prevailing overlap ratio of the slots of the slotted sleeves 20, 21. Since eddy currents influence the impedance of the measuring coils, the voltage drops at the measuring coils 19a, 19b also change corresponding to the relative angle of rotation.

Figure 3:
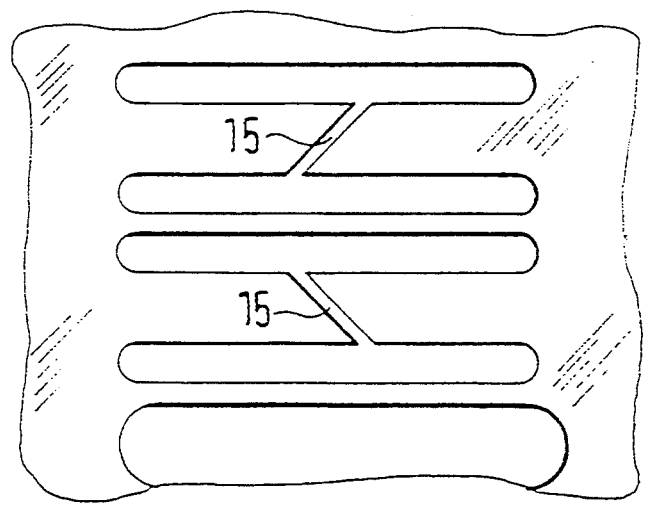
FIGS. 3 and 4 are side views of different embodiments of the torsion pipe according to FIG. 2.

If torque is transmitted by the torsion pipe 10, the narrower crosspieces 14 determine the torsional rigidity of the torsion shaft 10 with low torques. The slot 15 in the crosspiece 13 is constructed in such a way that this crosspiece 13 does not contribute to the torsional rigidity of the torsion pipe 10 at low torques, which means that the two parts 13a, 13b of the web 13 do not contact one another. If the transmitted torque, and accordingly the angle of torsion, exceed a determined value the two parts 13a, 13b of the crosspiece 13 contact one another, so that the torque is now additionally transmitted by the crosspiece 13. Depending on the construction of the slot 15 of the crosspiece 13 and on the geometric construction of the torsion pipe 10, the crosspiece 13 can serve as overload protection or as a second measurement area. Since the slots 15 in FIG. 3 are constructed in successive crosspieces 13 in opposite directions, protection against overloading or a second measurement area is possible in both rotating directions of the torsion shaft 10.

Figure 2:
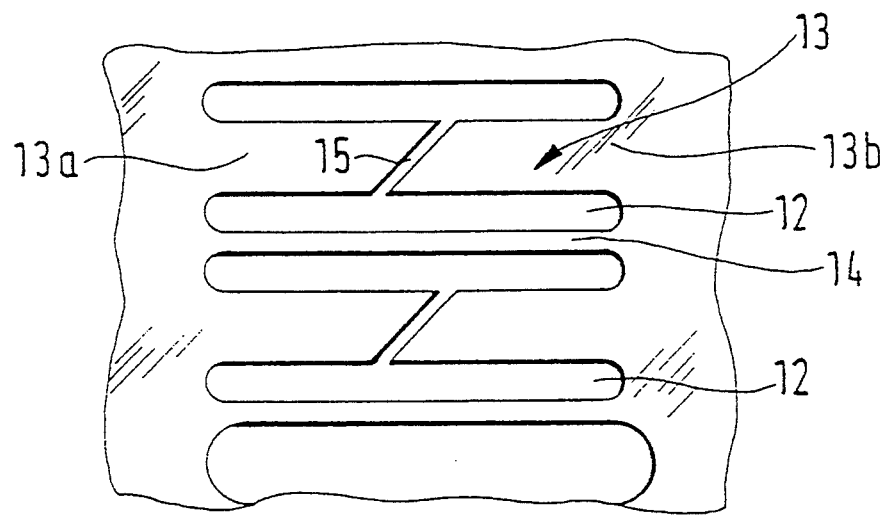
FIG. 2 is a side view of a torsion pipe.
Figure 4:
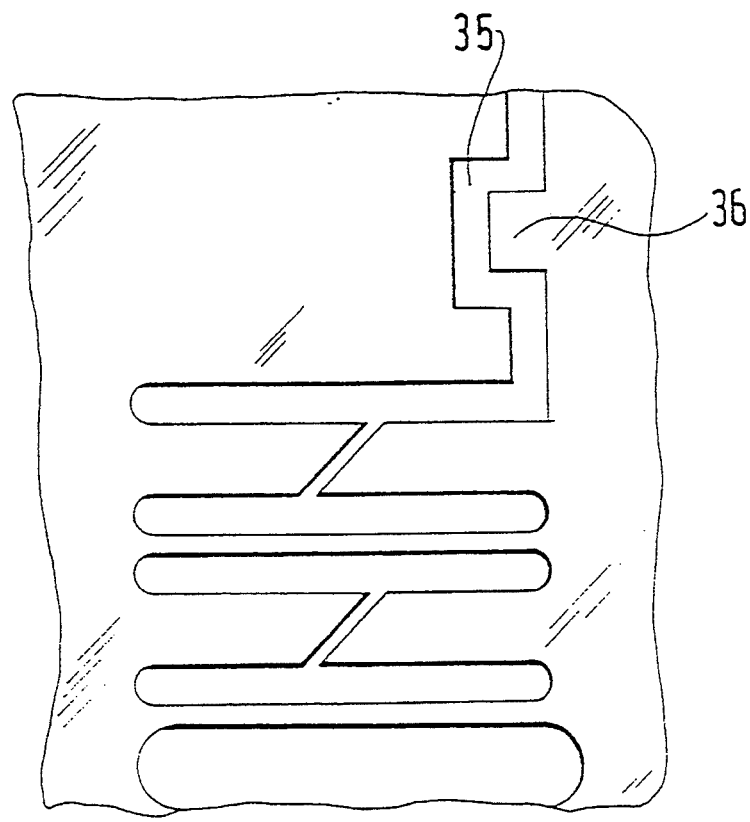
Figure 5:
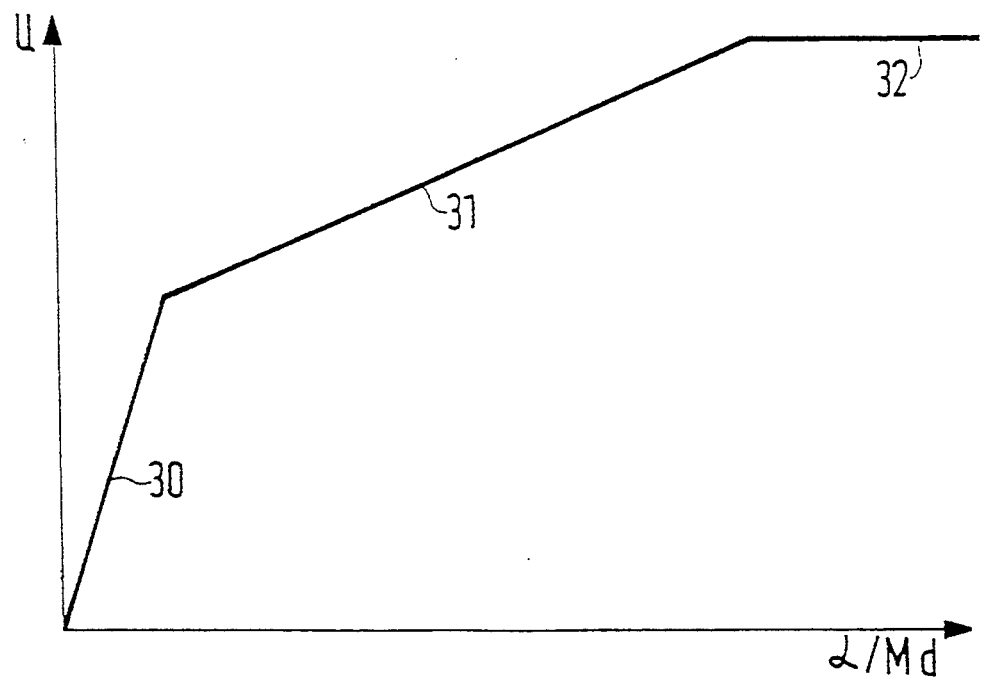
FIG. 5 is a graphical illustration of the relationship of the measurement voltage U over the torque Md and the angle α of rotation for the torsion pipe according to FIG. 4.
Figure 6:
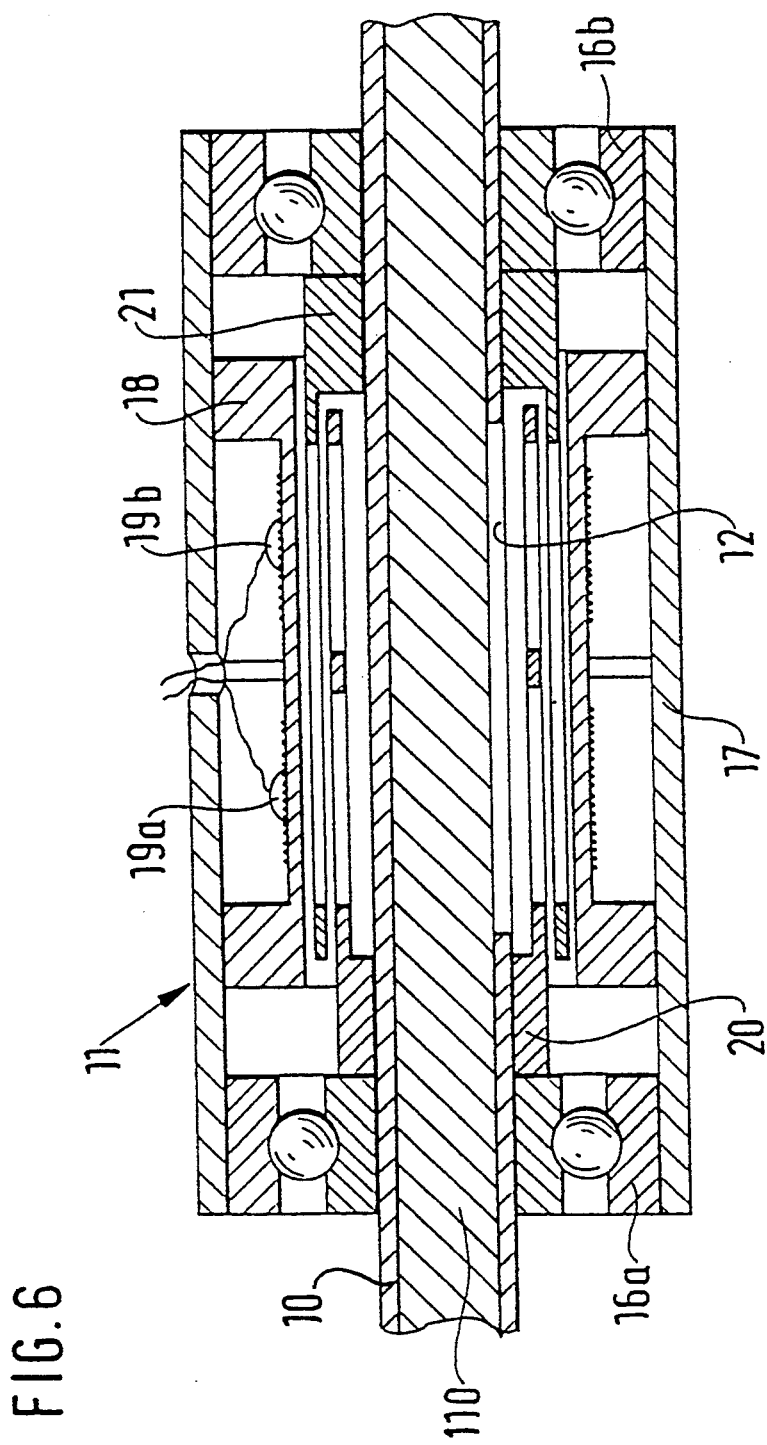
FIG. 6 shows another embodiment of the inventive torque sensor.

In FIG. 2, a second measurement area is switched to automatically as soon as the parts 13a, 13b of the crosspieces 13 contact one another. As a result of the greater width of the crosspiece 13, a higher torque can be transmitted by this crosspiece 13. In FIG. 5, the measurement signal U produced by the measuring device 11 is designated as curve segment 30 with reference to the torque transmitted by the crosspiece 13. The measurement signal U of the curve segment 31 s obtained as soon as the torque is transmitted by the crosspiece 13. The construction according to FIG. 2 accordingly works with two measurement ranges. If the slots 15 of all crosspieces 13 are identically constructed, the torsion pipe works without overload protection. However, one of the crosspieces and its slot can also serve as a kind of overload protection. But if an overload protection is to be provided for the torsion pipe 10 in addition to different measurement areas, the embodiment example according to FIG. 4 can be followed. In addition to the construction according to FIG. 2, a protuberance 36 projects into a recess 35 constructed in the torsion pipe 10. As soon as the protuberance 36 contacts the wall of the recess 35, depending on the rotating direction of the torsion pipe 10, the maximum transmissible torque is reached. The torsion pipe is practically no longer deformed and the curve segment 32 shown in FIG. 5 is obtained, which is horizontal in the ideal theoretical case and extends with a constant measurement signal U.

Depending on the construction of the crosspieces of the torsion pipe 10 and on the shape of the slots in the crosspieces, different desired measurement areas can be achieved. The desired measurement area of the torque sensor can be adjusted within still broader limits by means of additionally installing a torsion shaft 110 constructed as a solid shaft in the torsion pipe 10. The detection of the measurement signal by the eddy current method, which is shown in FIG. 1, is particularly advantageous in this instance. This measuring method makes it possible to determine even the smallest angle of rotation, and accordingly torques, with high measuring precision and high resolution and can also be used with high torques without being greatly modified.

The embodiment examples shown in the drawings are particularly advantageous, simple constructions. Since relatively complicated geometries in the torsion shaft can also be realized in an inexpensive manner by milling, laser cutting or erosion, the aforementioned figures are also possible in any desired combination without great expenditure. The utilized geometries can be produced corresponding to the desired measurement areas or the desired overload protection. Further, it is also conceivable to arrange additional structural component parts with more or less torsional rigidity or fixed stops in the torsion pipe area.

While the invention has been illustrated and described as embodied in a measuring device for determination of rotation angle or torque of a stationary or rotating shaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a measuring device for determining torque on and angle of rotation of a shaft, said measuring device comprising measuring means for angular orientation and a torsion pipe connectable with the shaft and having a plurality of throughgoing openings extending in an axial direction of the torsion pipe and arranged one after the other in a circumferential direction, the improvement wherein the torsion pipe (10) is provided with crosspieces (13) of greater rigidity and crosspieces (14) of lesser rigidity arranged one after the other in a circumferential direction, each of said crosspieces being located between two adjacent ones of the throughgoing openings (12), and each of said crosspieces (13) having a greater rigidity is provided with at least one slot (15) extending between the throughgoing openings (12) adjoining said crosspiece (13) of greater rigidity so that each of said crosspieces (13) of greater rigidity is divided into two crosspiece parts (13a,13b).

2. The improvement as defined in claim 1, further comprising a torsion shaft (110) located interiorly in the torsion pipe (10) so as to add additional mechanical torsional rigidity to the torsion pipe (10).

3. The improvement as defined in claim 1, further comprising two bodies (20,21) having end portions, each of said end portions of each of the two bodies (20,21) being rigidly attached to the torsion pipe (10) and spaced from each other so that both of said bodies are rotatable relative to each other when said torsion pipe is subjected to a torque, and said bodies overlap one another in the axial direction to form an overlapping area and, when said torsion pipe (10) is twisted, said overlapping area changes as the angle of rotation changes, and wherein said measuring means is provided with measurement coils (19,19b) to measure the overlapping area of the two bodies and to produce a measurement signal in at least one of the measurement coils (19a,19b) depending on said overlapping area.

4. The improvement as defined in claim 3, wherein said two bodies comprise an inner and outer slotted sleeve rotatable relative to each other and supported inside each other in a concentric manner.

5. In a measuring device for determining torque on an angle of rotation of a shaft, said measuring device comprising measuring means for angular orientation and a torsion pipe connectable with the shaft and having a plurality of throughgoing openings extending in an axial direction of the torsion pipe and arranged one after the other in a circumferential direction, the improvement wherein the torsion pipe (10) is provided with crosspieces (13) of greater rigidity and crosspieces (14) of lesser rigidity arranged one after the other in a circumferential direction, each of said crosspieces is located between two adjacent ones of the throughgoing openings (12), each of said crosspieces (13) having a greater rigidity is provided with at least one slot (15) extending between the throughgoing openings (12) adjoining said crosspiece (13) of greater rigidity so that each of said crosspieces (13) of greater rigidity is divided into two crosspiece parts (13a,13b), the crosspieces (13) of greater rigidity comprise broader crosspieces and the crosspieces (14) of lesser rigidity comprise thinner crosspieces, and each of the two crosspiece parts (13a,13b) of the crosspieces (13) of greater rigidity are structured to contact each other when a predetermined rotation angle is exceeded by the thinner crosspieces so that the torsion pipe (10) is protected against overloading due to the greater rigidity of the broader crosspieces.

6. In a measuring device for determining torque on an angle of rotation of a shaft, said measuring device comprising measuring means for angular orientation and a torsion pipe connectable with the shaft and having a plurality of throughgoing openings extending in an axial direction of the torsion pipe and arranged one after the other in a circumferential direction, the improvement wherein the torsion pipe (10) is provided with crosspieces (13) of greater rigidity and crosspieces (14) of lesser rigidity arranged one after the other in a circumferential direction, each of said crosspieces is located between two adjacent ones of the throughgoing openings (12), each of said crosspieces (13) having a greater rigidity is provided with at least one slot (15) extending between the throughgoing openings (12) adjoining said crosspiece (13) of greater rigidity so that each of said crosspieces (13) of greater rigidity is divided into two crosspiece parts (13a,13b), the crosspieces (13) of greater rigidity comprise broader crosspieces and the crosspieces (14) of lesser rigidity comprise thinner crosspieces, and each of the two crosspiece parts (13a,13b) of the crosspieces (13) of greater rigidity are structured to contact each other when a predetermined rotation angle is exceeded by the thinner crosspieces so that an additional measurement range is provided as a result of differences in rigidity of the crosspieces.

7. In a measuring device for determining torque on an angle of rotation of a shaft, said measuring device comprising measuring means for angular orientation and a torsion pipe connectable with the shaft and having a plurality of throughgoing openings extending in an axial direction of the torsion pipe and arranged one after the other in a circumferential direction, the improvement wherein the torsion pipe (10) is provided with crosspieces (13) of greater rigidity and crosspieces (14) of lesser rigidity arranged one after the other in a circumferential direction, each of said crosspieces is located between two adjacent ones of the throughgoing openings (12), each of said crosspieces (13) having a greater rigidity is provided with at least one slot (15) extending between the throughgoing openings (12) adjoining said crosspiece (13) of greater rigidity so that each of said crosspieces (13) of greater rigidity is divided into two crosspiece parts (13a,13b), and the slots (15) are oriented at an orientation angle of substantially 45° relative to the axial direction of the torsion pipe (10).

8. In a measuring device for determining torque on an angle of rotation of a shaft, said measuring device comprising measuring means for angular orientation and a torsion pipe connectable with the shaft and having a plurality of throughgoing openings extending in an axial direction of the torsion pipe and arranged one after the other in a circumferential direction, the improvement wherein the torsion pipe (10) is provided with crosspieces (13) of greater rigidity and crosspieces (14) of lesser rigidity arranged one after the other in a circumferential direction, each of said crosspieces is located between two adjacent ones of the throughgoing openings (12), each of said crosspieces (13) having a greater rigidity is provided with at least one slot (15) extending between the throughgoing openings (12) adjoining said crosspiece (13) of greater rigidity so that each of said crosspieces (13) of greater rigidity is divided into two crosspiece parts (13a, 13b), and the slots (15) in successive crosspieces (13) of greater rigidity are oriented in different directions relative to each other.

9. In a measuring device for determining torque on an angle of rotation of a shaft, said measuring device comprising measuring means for angular orientation and a torsion pipe connectable with the shaft and having a plurality of throughgoing openings extending in an axial direction of the torsion pipe and arranged one after the other in a circumferential direction, the improvement wherein the torsion pipe (10) is provided with crosspieces (13) of greater rigidity and crosspieces (14) of lesser rigidity arranged one after the other in a circumferential direction, each of said crosspieces is located between two adjacent ones of the throughgoing openings (12), each of said crosspieces (13) having a greater rigidity is provided with at least one slot (15) extending between the throughgoing openings (12) adjoining said crosspiece (13) of greater rigidity so that each of said crosspieces (13) of greater rigidity is divided into two crosspiece parts (13a, 13b), the torsion pipe (10) is provided with a recess (35) and an adjacent protuberance (36) projecting into the recess (35).

* * * * *